United States Patent Office.

THE METALLIC COMPRESSION CASTING COMPANY, OF BOSTON, MASSACHUSETTS, ASSIGNEES OF JOHN JOSEPH CHARLES SMITH.

*Letters Patent No.* 85,340, *dated December* 29, 1868; *reissue No.* 3,409, *dated April* 27, 1869.

IMPROVEMENT IN CLAY MOULDS AND PATTERNS FOR CASTING METALS.

The Schedule referred to in these Letters Patent and making part of the same.

*To all whom it may concern:*

Be it known that I, JOHN JOSEPH CHARLES SMITH, of Somerville, in the county of Middlesex, and State of Massachusetts, and formerly of the city and county of Philadelphia, State of Pennsylvania, have invented a new and useful mode of Making Moulds and Patterns, to be used for casting metals under pressure; and I do hereby declare the following to be a full and clear description of the same.

The object of this invention is to make a perfect, sharp, and well-defined mould or pattern to be used for casting metals under pressure into the same.

There are two different methods of casting metal under pressure, and by which my moulds may be and are applied in practical use with great advantage, and which methods I shall describe and refer to hereafter.

It has been known by many acquainted with the nature of metals, that if a high pressure could be brought to bear either on the fluid metal, or when it is in the semi-fluid state, a better and more sharply-defined casting would be obtained; but, beside other mechanical difficulties to be overcome in order to do this, the necessity of a suitable mould existed.

The properties required of a mould to be used for casting metals under pressure are—

First, the mould must be of sufficient density and strength, so that the fluid metal will not enter into the pores of the mould by the pressure exerted on the metal.

Second, the presence of some very fine pores, for the escape of the air confined in the cavities of the mould, is another condition required.

Third, the mould must be of sufficient strength and hardness, so as not to break, and of great hardness, so that the fine lines and sharply-defined corners of the mould are not crushed or flattened by the pressure of the metal.

Fourth, they must be of a non-conducting nature to heat, so that the metal will not chill, and set too quickly to allow time to perform the casting.

It might be supposed by many that moulds made of iron or steel would answer all required of a mould to be used for casting metal under pressure; but those acquainted with the nature of fluid refractory metals know that they chill or set so rapidly, when they come in contact with other colder metal surfaces, that the surface, or outside of a casting to be made in a metal mould, would be chilled or set before pressure is applied to the metal, unless the pressure is applied at the very act of filling the mould, as it may be done by means of the patent apparatus of Michael Smith.

This above said sudden setting of the metal forms streaks or seams on the surface of the casting.

If metal moulds are highly heated, to prevent, to a certain extent, the sudden chilling, the fluid metal will unite with the mould, especially the alloys of copper and tin; and even if metal moulds could be used with advantage, the expense of making them would forbid their use in cases where only a limited number of castings is wanted of one and the same pattern, and in some cases the utter impossibility of making them.

To overcome the disadvantages named, and to produce the favorable conditions wanted of such moulds, as first above said, is the object of my invention.

I shall now describe the manner in which I make such moulds, and thereafter the manner by which they are brought into use.

I take fine clay of such kinds that will resist a considerable degree of heat without glazing or melting on the surface. Said clay, after it has been well mixed and worked in the same manner as it is prepared for pottery, is made dry, so that it may be reduced to powder.

When reduced to powder, I moisten the same with water, about as much as sand used for ordinary moulding; this being done, I take any pattern, which, if to be used for a number of moulds, ought to be of metal.

For one or two impressions said pattern may be of hard plaster of Paris, or hard wood. If of these two last-named materials, they must be first coated with shellac-varnish. The pattern is then rubbed over with a little oil, (preferably paraffine-oil,) applied with a brush, so that it may be released easily from the moist clay. After oiling, the pattern is coated over with a fine paste-like slush, made of the same clay used for moulding. Then I place the pattern, or a number of them, into an iron or brass flask, or frame suitable for the size and thickness of the mould to be made, and provided with a bottom and a plunger or follower, and fill the flask with moist-clay powder on top of the pattern. Then place the plunger or follower in position, and bring the whole under a powerful press, and subject it to a slowly applied but high pressure, say about three hundred to four hundred pounds to the square inch, thereby packing and pressing the loose powder into a compact and solid block.

After sufficient pressure is applied, I let it stand under the press for a few minutes, so that the surplus moisture or water in the slush may be absorbed by the more dry-clay powder.

The purpose of the slush is to unite the loose particles of the clay-powder, in direct contact with the pattern, to a fine and hemogeneous mass. The flask may then be removed from the press, and the bottom taken off; this done, the pattern is easily taken out, and a mould will be found as perfect and smooth as if made of wax or gypsum.

If a mould is to be made consisting of two or more parts, the first part made is coated on the surface coming in contact with the surface of the next part to be made, with a slight coat of collodion or thin shellac-varnish, so as to make a partition between the clay surfaces; and they may be separated without difficulty.

When the mould is all done, it may be taken out of the flask or frame, and handled or carried without danger of breaking into pieces.

The moulds made are rendered dry by exposure to the influence of air or gentle heat.

When most of the moisture is evaporated the moulds are placed into furnaces similar to those used for burning pottery, and the heat gradually raised until the moulds are red hot, which will burn them about as hard as a soft brick or clay-stone.

When cooled off they are ready for casting.

As it is necessary to keep these moulds in the same shape as when first made, and whereas articles made of clay are very liable to vary during the process of drying and burning, unless it is done with great care and waste of time; for the prevention of these evils, I use, to one part of clay-powder, made of fresh or new clay, another half of clay-powder, made of clay which has been previously burnt, or of old clay moulds which have been used for casting. The compound of these two different kinds of clay-powder is very beneficial, as it prevents the varying of the moulds, even if they are of considerably large size.

Moulds made in the manner described are especially well adapted to be used in the casting-apparatus of Michael Smith, patented by him October 22, 1867, No. 70,038.

Moulds to be used for another more simple method of casting metal under pressure, which is hereafter specified, by which method only larger pieces of one face, such as moulds, dies, matrices, &c., used in different branches of manufacture, can be cast, I make in the same manner described, only I prefer to use, instead of ordinary clay, the clay-composition used for black-lead crucibles, or for good fire-tiles. The only difference I make is to fill the iron-box or frame first with clay-powder, and place the pattern face down. The reason for doing so is that the clay-mould is left in the iron box, and the bottom of the box is not removable; therefore the pattern must be placed on top of the powder, that it may be taken out after the impression is performed.

The iron box or flask used for the clay mould ought to be of the outside size and shape of the die or mould to be cast in metal, and the bottom ought to be provided with a hole or slot. for the purpose presently seen.

When the pattern is removed the clay mould is made dry.

After drying, and while still in the iron box, it is placed into a muffle-furnace, and the heat gradually raised until the mould and iron box are brought to a heat nearly equal to the heat of the metal to be cast into it. While this is done, the metal to be used is melted in another furnace; then the clay mould is taken out of the furnace, and filled with so much of the fluid metal as necessary to make the article, allowing a small surplus to be acted on by the follower.

The surplus of metal is kept from overflowing by the iron collar or frame which extends above the clay moulds.

When so far filled, the follower is put on top of the fluid metal, and then the whole is placed under a screw or lever-press.

During the time required to perform the filling of the mould, and placing under the press, the fluid metal becomes mushy or semi-fluid, and if pressure is applied the metal will take a perfectly sharp impression of the mould.

When the whole is cooled off, the casting is removed out of the iron-collar or base, by driving something through the hole left for that purpose in the bottom the box.

The alloys of copper and tin are most favorable for this process of casting; but it may also be employed for other refractory-metal compositions with good success.

This method of casting a mould-die, and other single-face casting, is somewhat analogous to a process patented by me September 20, 1859, and reissued February 3, 1860, where I used metallic patterns and moulds in a similar manner; but this said process was expensive on account of the metallic patterns to be used, and if the process is not performed with the greatest care and attention, the metal pattern or mould used to be copied was lost, on account of uniting with the metal, and could not be removed.

In making large pieces great practice was also required for the performance. Now, by the use of clay moulds, and the application of the principle specified in my patents of 1859 and 1860, the making of such moulds, dies, &c., requires but little skill and practice.

On the ground that a patent has been granted to me already for the method of casting moulds, dies, matrices, &c., by applying pressure to a refractory-metal composition when in the semi-fluid or plastic state, I lay no new claim on this method of casting, but I restrict myself in this application to the manner in which I make moulds of clay, so as to be used for casting metal under pressure by any method or apparatus.

In order to point out and have the novelty of my invention appreciated, it is necessary to make a somewhat lengthy explanation.

I am aware that moulds have been made of clay when in a plastic state for different purposes. I am also aware that clay mixed with sand is used for making moulds to be used for casting large bells and other heavy bronze and brass castings, so as to give strength to the sand, that it may resist the pressure of a great mass of metal.

Now, those acquainted with the art of forming moulds and other things of plastic clay, know that it is very difficult, and almost impossible, to press plastic clay into deep cavities of patterns, especially if the pattern is made of metal, or other material of great density, because the air will always be more or less confined in the cavities, and prevent the admission of the clay, so as to produce a sharp and perfect impression.

Another disadvantage, and that not the least, is that clay used in the plastic kneadable state will shrink very much, thereby reducing the size and form of the article to be moulded; further, an article formed or moulded of plastic clay is so much liable to warp, and get out of shape by handling and during the process of drying. But by my process of using a moist clay-powder, and forming it into a compact mass by high pressure, I obviate those difficulties entirely.

By using first a coating of slush, applied over the pattern with a brush, I bring the clay into every cavity of the pattern at the start; then the moist clay-powder, being first in a loose state, attaining its strength and hardness gradually by the pressure, slowly applied, permits the easy escape of the air from the cavities of the pattern, and throughout the whole mass, and produces a perfect, sharp impression.

Further, by using moist-clay powder, and making it a compact block, by means of high pressure, the mould is, when formed, comparatively to a mould made of plastic clay, in a greatly advanced state of dryness, may be handled and carried about without getting out of shape, and as it contains not one-fourth part as much water as plastic clay, will shrink very little, almost nothing, thereby keeping the shape and size first given in making.

Further, by mixing with fresh or new clay-powder, one-half of powder made of burnt clay, the mould is not liable to warp and crack during the process of drying and burning.

The application of slush, made of clay, as a facing, closes the pores, and unites the clay-powder into a fine and plastic mass where it comes in direct contact with the pattern.

The slush is rendered quickly plastic by absorption of the surplus of water it contains by comparatively dry-clay powder in the rear.

Now, as I call the application of slowly-applied pressure a novelty, I must show reason why I do it.

If I would attempt to form loose moist-clay powder into a compact and solid mass, as a good mould must be, by means of stamping and ramming, as it is done in the ordinary way of moulding, it not only takes a great deal of labor, but, after removing the pattern, the mould would be of insufficient and unequal compactness, and imperfect impression; and, further, if the mould were removed from the flask, it would not properly hold together in burning, but falls to pieces, as if the mould had been made of a number of layers of clay.

If high pressure shall be applied, by means of machinery, in a sudden jerk, or at a momentum, the same results would occur; but if pressure is applied slowly and gradually, the loose particles of the clay-powder are gradually and firmly united into a solid compact mass of uniform density, entering perfectly sharp into every cavity of the pattern.

The labor required to form a mould in the manner described is but little more than in forming a mould in the ordinary way of moulding.

I am aware that building-blocks, bricks, and other such-like articles, have been formed of moist-clay powder by means of high pressure; but the use and application of the principle to another entirely different branch of manufacture, and for the use of forming moulds for casting metal, although in some respects analogous to what has been known before for other purposes, is a new application of a known principle, effecting a substantially new result.

What I claim as new, and desire to secure by Letters Patent, is—

A mould or pattern made of moist-clay powder, formed under high but slowly-applied pressure, for use in casting metals, substantially as described.

METALLIC COMPRESSION CASTING COMPANY,
By J. J. CH. SMITH, *President.*

Witnesses:
JOHN STEPP,
F. H. KINGSBURY.